United States Patent
Hsieh et al.

(10) Patent No.: US 7,160,224 B2
(45) Date of Patent: Jan. 9, 2007

(54) SINGLE MOTOR RECOVERY FOR AN ELECTRICALLY VARIABLE TRANSMISSION

(75) Inventors: Tung-Ming Hsieh, Carmel, IN (US); Gregory A. Hubbard, Brighton, MI (US); Todd M. Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 188 days.

(21) Appl. No.: 10/846,143

(22) Filed: May 14, 2004

(65) Prior Publication Data

US 2005/0255963 A1    Nov. 17, 2005

(51) Int. Cl.
    *B60K 1/02* (2006.01)
(52) U.S. Cl. .......................... 477/3; 903/942
(58) Field of Classification Search ............ 477/3, 477/906; 475/5; 701/51, 62; 903/930, 941, 903/942; 180/65.2, 65.4
    See application file for complete search history.

(56) References Cited

U.S. PATENT DOCUMENTS

| | | | |
|---|---|---|---|
| 5,818,116 A * | 10/1998 | Nakae et al. | 903/941 |
| 6,053,842 A * | 4/2000 | Kitada et al. | 477/906 |
| 6,208,034 B1 * | 3/2001 | Yamaguchi | 903/942 |
| 6,232,733 B1 * | 5/2001 | Obayashi et al. | 475/5 |
| 6,356,817 B1 * | 3/2002 | Abe | 903/942 |
| 6,523,436 B1 * | 2/2003 | Minowa et al. | 903/940 |
| 6,732,526 B1 * | 5/2004 | Minagawa et al. | 475/5 |
| 6,901,324 B1 * | 5/2005 | Rose et al. | 701/54 |
| 6,965,824 B1 * | 11/2005 | Ichimoto et al. | 180/65.2 |
| 2004/0084234 A1 * | 5/2004 | Yatabe et al. | 180/65.2 |
| 2004/0162182 A1 * | 8/2004 | Joe et al. | 477/2 |
| 2005/0182526 A1 * | 8/2005 | Hubbard et al. | 701/67 |

FOREIGN PATENT DOCUMENTS

JP    02004138158 A  *  5/2004  ............ 903/942

* cited by examiner

*Primary Examiner*—Roger Pang
(74) *Attorney, Agent, or Firm*—Dan L. Thompson

(57) ABSTRACT

A vehicular powertrain includes operatively coupled engine, electrically variable transmission and driveline. During normal operation when all motors are operating as expected, the engine is operated in a torque control mode in accordance with a torque command provided by a system controller to an engine controller and engine speed is controlled by the motors. During operation when all motors are not operating as expected, the engine is operated in a speed control mode in accordance with a speed command provided by the system controller to the engine controller and engine load torque is controlled by the operative motors.

8 Claims, 4 Drawing Sheets

SINGLE MOTOR RECOVERY FOR AN ELECTRICALLY VARIABLE TRANSMISSION

TECHNICAL FIELD

The present invention is related to electrically variable transmission control. More particularly, the invention is concerned with dual-motor electrically variable transmissions and recovery from single motor anomalies.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation.

An EVT control relies upon an engine operable in a torque control mode to provide an input torque in accordance with predetermined engine torque operating points commanded by the EVT control. The EVT control includes a system dynamic model which assumes a system torque balance among various controlled and uncontrolled, internal and external torques. Input and output torques are treated by the model as uncontrolled external torques and motor torques are treated by the model as controlled torques. Motor torques are controlled in accordance with the model to control engine speed at the commanded engine torque to a desired engine speed.

Loss of proper operation of one of the motors in such a transmission may make such a control, which relies upon predictable torque production at both motors, impractical for controlling engine speed as intended. Therefore, what is needed is a robust recovery control for the situation where one of the two motors is rendered functionally inoperative so that the vehicle is not stranded due to such a single point system anomaly.

SUMMARY OF THE INVENTION

The present invention relates to a vehicular powertrain including an EVT having operatively coupled engine, driveline and motors. The engine is normally operated in a torque control mode in response to a torque command and the EVT motors operatively coupled thereto control engine speed when all motors are operative. The present invention provides a method for operating the vehicular powertrain wherein the engine is operated in a speed control mode in response to a speed command and the EVT motors operatively coupled thereto control the load torque applied to the engine when at least one motor is not operating as expected. The load torque applied to the engine are feasible in accordance with the at least one inoperative motor. Engine load torque is adjusted as a function of the difference between desired engine speed and actual engine speed.

DESCRIPTION OF THE PREFERRED EMBODIMENT

Figure 1:
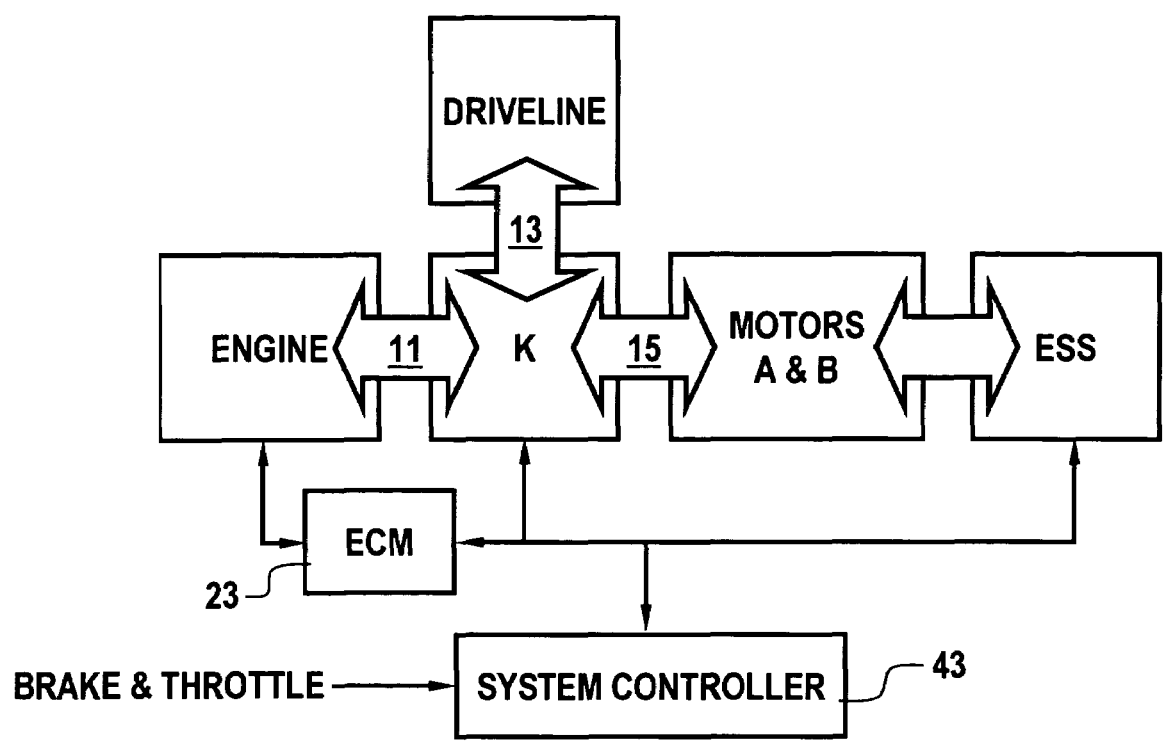
FIG. 1 is a block diagram of dual-motor, hybrid vehicle powertrain in accord with the present invention.

With reference first to FIG. 1, a block diagram of an exemplary dual-motor, electrically variable transmission powertrain to which the present single motor recovery is applicable is illustrated. The powertrain includes a diesel compression ignition engine, a vehicle driveline and a pair of electric motors. The motors (identified as A and B), driveline and engine are operatively coupled to one another, for example, through a coupling means (K) comprising one or more planetary gearsets and selective coupling paths established in accordance with application and release of various torque transfer devices, e.g., clutches. The engine is coupled (11) to the coupling means at a mechanical input thereof. The driveline is coupled (13) to the coupling means at a mechanical output thereof. The motors are coupled (15) to the coupling means at various rotating members of the planetary gearsets. Neglecting power losses, the power flows between the engine, driveline and motors balance. And, the power at the driveline is equivalent to the summation of the powers at the engine and motors. Engine, driveline and motor torques follow the same relationships and are known through the various gearsets, power transmission components and the relationships therebetween as embodied in coupling constraint relationships. Speed relationships between the engine, driveline and motor are also known through the various gearsets, power transmission components and the relationships therebetween as embodied in coupling constraint relationships. The vehicle driveline may include such common driveline components as differential gearsets, propshafts, universal joints, final drive gearsets, wheels and tires. The electric motor receives electric power from and provides electric power to an energy storage system (ESS) which may take the form of one or more batteries in a battery pack module or any appropriate energy storage means capable of bidirectional electrical energy flow. Engine, driveline and motor torques may be in either direction. That is to say, each is capable of bidirectional torque contributions to the powertrain. An exemplary electrically variable transmission comprising a diesel engine, a pair of electric motors and a pair of selectively coupled planetary gearsets and preferred for application of the present control is disclosed in commonly assigned U.S. Pat. No. 5,931,757, the contents of which are incorporated herein by reference.

The exemplary powertrain of FIG. 1 also includes a microprocessor based system controller 43 that communicates with the engine via a conventional microprocessor based engine control module (ECM) 23. The ECM 23 preferably communicates with the system controller 43 over a controller area network (CAN) bus. The engine controller, in turn, is adapted to communicate with various engine actuators and sensors (not separately illustrated) used in the control thereof. For example, fuel injectors, exhaust brake or engine brake actuators and rotation sensors are controlled or monitored by discrete signal lines at the engine controller. The ECM 23 is selectively operable to control the engine in either of a torque mode or a speed mode. The system controller 43 communicates with various coupling means actuators and sensors used in the control thereof. For example, output rotation sensors, solenoid control valves for controlling torque transfer device hydraulic pressure and apply/release states thereof, and hydraulic fluid pressure switches or transducers, are controlled or monitored by discrete signal lines. Additionally, the system controller 43 communicates similarly with a microprocessor based battery pack controller and microprocessor based power electronics controller (not separately illustrated), collectively referred to as ESS controllers. These ESS controllers preferably communicate with the system controller 43 over a CAN bus. The ESS controllers, in turn, are adapted to provide a variety of sensing, diagnostic and control functions related to the battery pack and motor. For example, current and voltage sensors, temperature sensors, multi-phase inverter electronics and motor rotation sensors are controlled or monitored by the ESS controllers.

Powertrain control has the general objective of meeting the operator torque request. Under normal system operation the control is preferably accomplished with selected engine torque and speed operating points in accordance with predetermined criteria, including system efficiency objectives. Engine torque control is handled by the engine controller in accordance with a commanded engine torque determined by the system controller, and engine speed control is handled by a speed control effected through the control of electric motor torque by the system controller and ESS controllers. Preferred methods for determining engine speed and engine torque and controlling engine speed are disclosed in commonly assigned and co-pending U.S. Ser. Nos. 10/686,511, 10/686,508, 10/686,034, and 10/799,531, which are all incorporated herein by reference. Under normal system operation, system controller 43 determines a desired output torque for use by the engine controller 23 in a torque control mode of engine operation. And, system controller 43 determines a desired input speed for use by the system controller to effect motor torques necessary to establish the input speed in accordance with the desired input speed. The powertrain controls are adapted in the present invention through provision of desired engine speed to the engine controller for use in a speed control mode of engine operation and controlling the load torque at the transmission input through motor torque.

The present invention is concerned with operation of the vehicle in a manner in which substantially no torque contribution is established by one of the two motors and further wherein engine speed control mode is implemented instead of engine torque control as alluded to herein above.

In the exemplary EVT the following general matrix equation, has been determined using Newton's law for each independent free body diagram:

$$[Ni\_dot\ No\_dot]^T = [A] * [Ti\ Ta\ Tb\ To]^T \qquad (1)$$

where
Ni_dot is input member acceleration;
No_dot is output member acceleration;
Ti is externally applied input member torque;
Ta is externally applied motor A torque;
Tb is externally applied motor B torque;
To is externally applied output member torque; and
A is a 2×4 matrix of parametric values determined by the particular hardware gear and shaft interconnections and estimated hardware inertias applicable to an active gearset coupling.

Other different independent member accelerations may be substituted for those shown above to arrive at similar matrix equations. Ni_dot and No_dot are selected as expedient since both input and output speed are quantities of general interest in other areas of the transmission and vehicle controls and are hence preferred. The matrix equation form is identical for different modes in a multimode transmission. The parametric constants [A], in however may differ.

This basic system dynamic model of the EVT to be controlled provides the basis for the transmission input speed control in accordance with properly operational dual motors. This model is rearranged to solve for motor torques Ta and Tb as follows:

$$[Ta\ Tb]^T = [B] * [Ti\ To\ Ni\_dot\ No\_dot]^T \qquad (2)$$

where B is a 2×4 matrix of parametric values determined by the hardware gear and shaft interconnections and estimated hardware inertias applicable to the currently active gearset and represents what is commonly referred to as the plant model.

Figure 2:
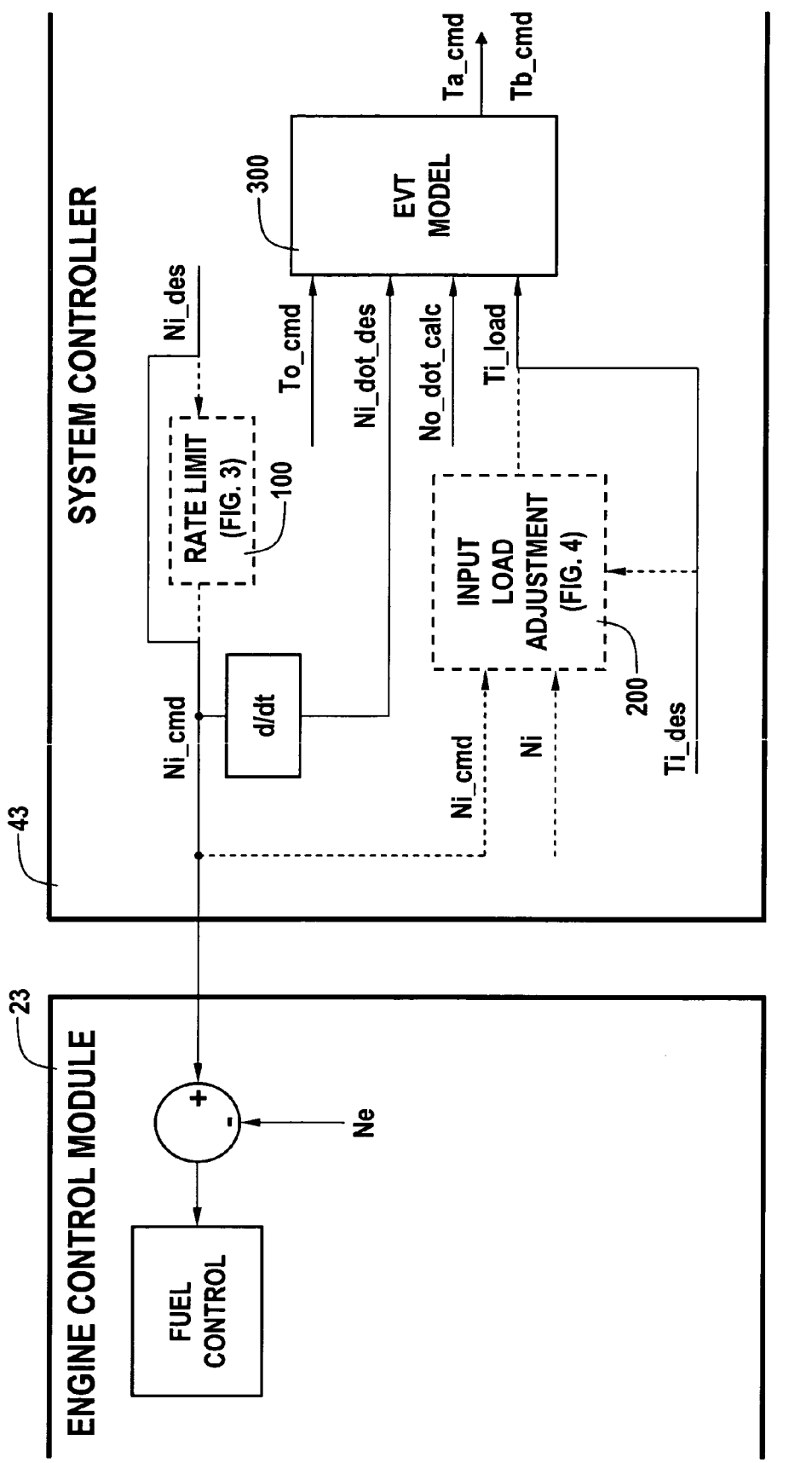
FIG. 2 illustrates schematic engine and system controller architecture and control diagrams to effect the single motor recovery of the present invention.

This model is utilized in the single motor recovery control of the present invention with exemplary architecture as shown in FIG. 2. The motor torque commands are calculated based upon the system dynamic model parameters, [B], and specially formulated inputs (Ti, To, Ni_dot, No_dot) to the model 300. The choices of application for each of these specially formulated inputs are described below with continued reference to FIG. 2 and additional reference to FIGS. 3–4.

The preferred implementation for output member torque To is to provide a desired output torque to be produced by the transmission, To_cmd, for To. In the model utilized in the EVT control of the present invention To is considered an external torque acting upon the output member. The external output torque is assumed equal and opposite to the EVT produced output torque and hence To is equated to To_cmd. The determination of To_cmd is made based upon several factors such as driver inputs of accelerator pedal position, brake pedal position, shift selector position; vehicle dynamic conditions such as acceleration rate or deceleration rate; EVT operational conditions such as temperatures, voltages, currents and speeds. Specifically with respect to the one of the motors A and B identified anomalous, motor torque generation therefrom is assumed to be zero. As such, the motor torque limits that are utilized in the determination of To_cmd are adjusted to comport with such assumption, thereby resulting in a desired output torque to be produced by the transmission, To_cmd, that is constrained in accordance with the assumed zero torque contribution from the anomalous motor. A motor anomaly is identified by a system diagnostic, for example such as described in co-pending and commonly assigned U.S. Ser. No. 10/846,000.

The preferred implementation for input member acceleration Ni_dot is to provide a desired rate of change of input speed, Ni_dot_des, for Ni_dot. The desired rate of change of input speed, Ni_dot_des, is determined by taking the derivative with respect to time of a desired input speed command, Ni_cmd. The desired input speed command may correspond to a provided desired input speed (Ni_des) or to such an input speed rate limited. One method of determining a desired input speed is through a selection routine designed to provide an optimum operating point in input speed in accordance with predetermined efficiency and other objectives. Determination of a desired input speed in accordance with such an optimum selection is described in detail in commonly assigned and co-pending U.S. Ser. Nos. 10/686,508 and 10/686,034, previously incorporated herein by reference.

Figure 3:
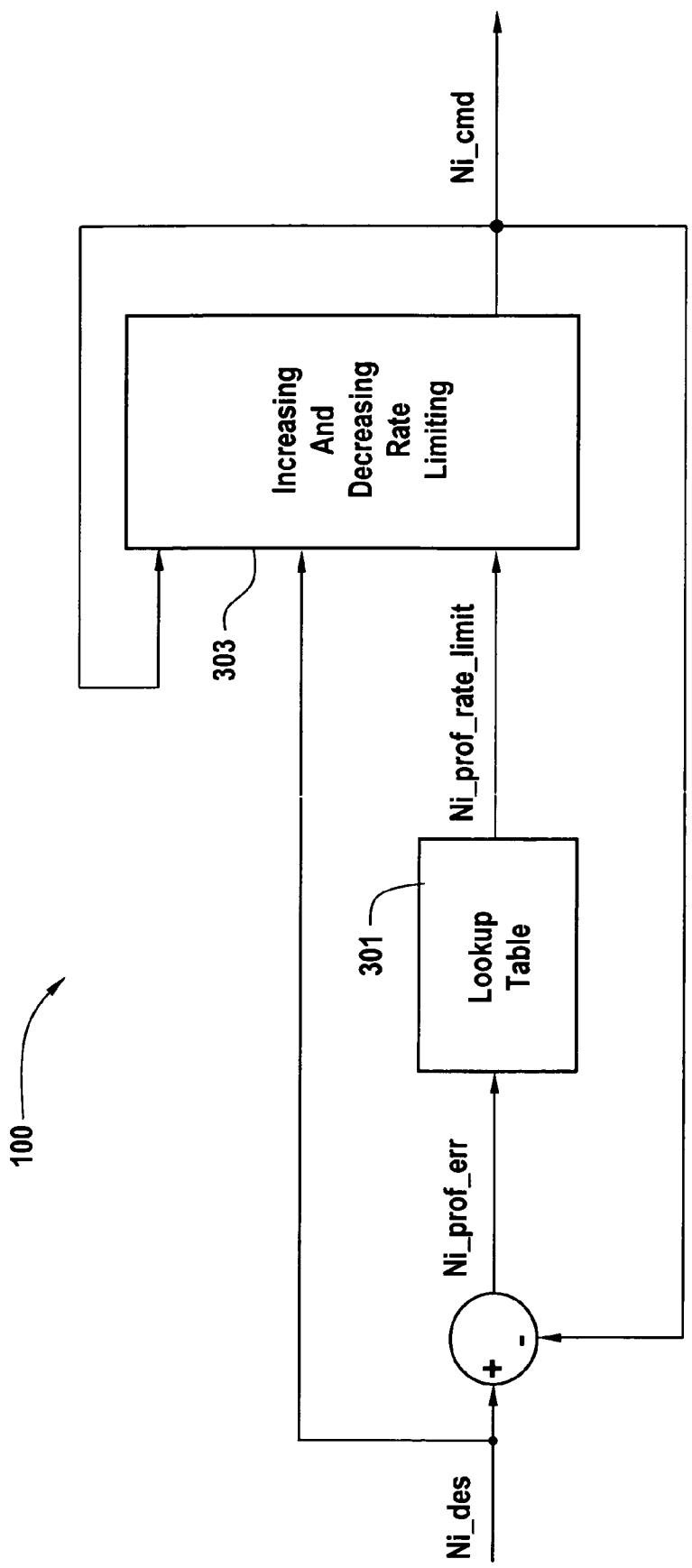
FIG. 3 is a schematic rate limiting control diagram corresponding to the rate limit illustrated in FIG. 2 in accordance with the present invention.

Rate limiting may be applied to the desired input speed as further described herein below in conjunction with the rate limit block 100 shown in FIG. 2 and detailed in FIG. 3 to effectively filter out input speed command fluctuations. Given a desired input speed, Ni_des, an input speed trajectory is determined, called an input speed profile. This profile is the desired input speed command, Ni_cmd. The present value of the trajectory, Ni_cmd, is subtracted from the desired speed, Ni_des to obtain an input speed profile error, Ni_prof_err. This error is then used in a lookup table to determine the allowable rate of change for the input speed profile, Ni_prof_rate_limit. The values used within the lookup table are empirically determined based upon objective and subjective criteria such as system responsiveness capability, noise and vibration due to changes in engine operating speed, vehicle stability, and effects on engine operating characteristics such as fuel economy and emissions that may be related to the change rate of engine operation. In general, it is desirable to allow a higher rate of change, Ni_prof_rate_limit, for a larger error, Ni_prof_err. Then the present value of the profile, Ni_cmd, the desired final value of the profile, Ni_des, and the allowable rate of change, Ni_prof_rate_limit, are inputs to a rate limiter. This rate limiter allows the value of the profile, Ni_cmd, to be modified in the direction of the final value, Ni_des, at a rate that is no faster than the rate limit, Ni_prof_rate_limit, until the profile, Ni_cmd, becomes equal to the desired value, Ni_des.

The preferred implementation for output member acceleration No_dot is to provide a calculated output member acceleration, No_dot_calc, for No_dot. No_dot_calc is determined by taking the derivative of measured EVT output member speed, No, with respect to time and then applying a filter to this derivative to eliminate large disturbances from the calculation as follows:

$$No\_dot\_calc = Filter[d(No)/dt] \quad (3)$$

The preferred implementation for input member torque Ti is to provide a desired input load torque, Ti_load, for Ti. The desired input load torque may correspond to a provided desired input load torque (Ti_des) or to such an input load torque adjusted for gross engine speed deviations from desired. One method by which desired input load torque Ti_des is determined is through an input torque optimization wherein input operating points are determined in accordance with aggregate system efficiency considerations and battery power throughput considerations. Selection of an optimum input torque operating point is described in detail in commonly assigned and co-pending U.S. Ser. No. 10/799,531 previously incorporated herein by reference. Whereas the optimum input load torque, Ti_des, is utilized in a normally operating dual-motor speed control to establish a torque command for the engine to operate in the torque control mode, Ti_des is utilized in the present invention to provide a load torque presented to the engine at the EVT input to be countered by torque produced by the engine operating in the speed control mode. Again, specifically with respect to the zero motor torque assumption of the one of the motors A and B identified anomalous, the motor torque limits that are utilized in the determination of Ti_des are adjusted to comport with such assumption, thereby resulting in desired input load torque, Ti_des, that is constrained or feasible in accordance with the assumed zero torque contribution from the anomalous motor. Of course, the input load torque, Ti_load, whether unadjusted or adjusted in accordance with the description herein below, will be affected by the constrained desired input load torque, Ti_des, and also comport with such constraints.

The input speed command, Ni_cmd, is provided to the ECM 23 for use in a speed control of the engine. ECM 23 provides engine speed (Ne) which in the direct coupled embodiment of the present EVT also substantially corresponds to the EVT input speed. Derivation of EVT input speed is discussed further herein below. Engine speed, Ne, is determined by conventional speed processing techniques operative upon speed sensor signals from an engine crankshaft rotation sensor or other common sensing and processing arrangement as well known in the art of engine controls and sensing. The input speed command and the engine speed together provide the basis for a closed loop speed control of the engine wherein the goal is to drive engine speed errors to zero. In the exemplary fuel throttled diesel engine embodiment, this is accomplished by fuel control. In an air throttle engine this would analogously be accomplished by air control and attendant fueling.

Figure 4:
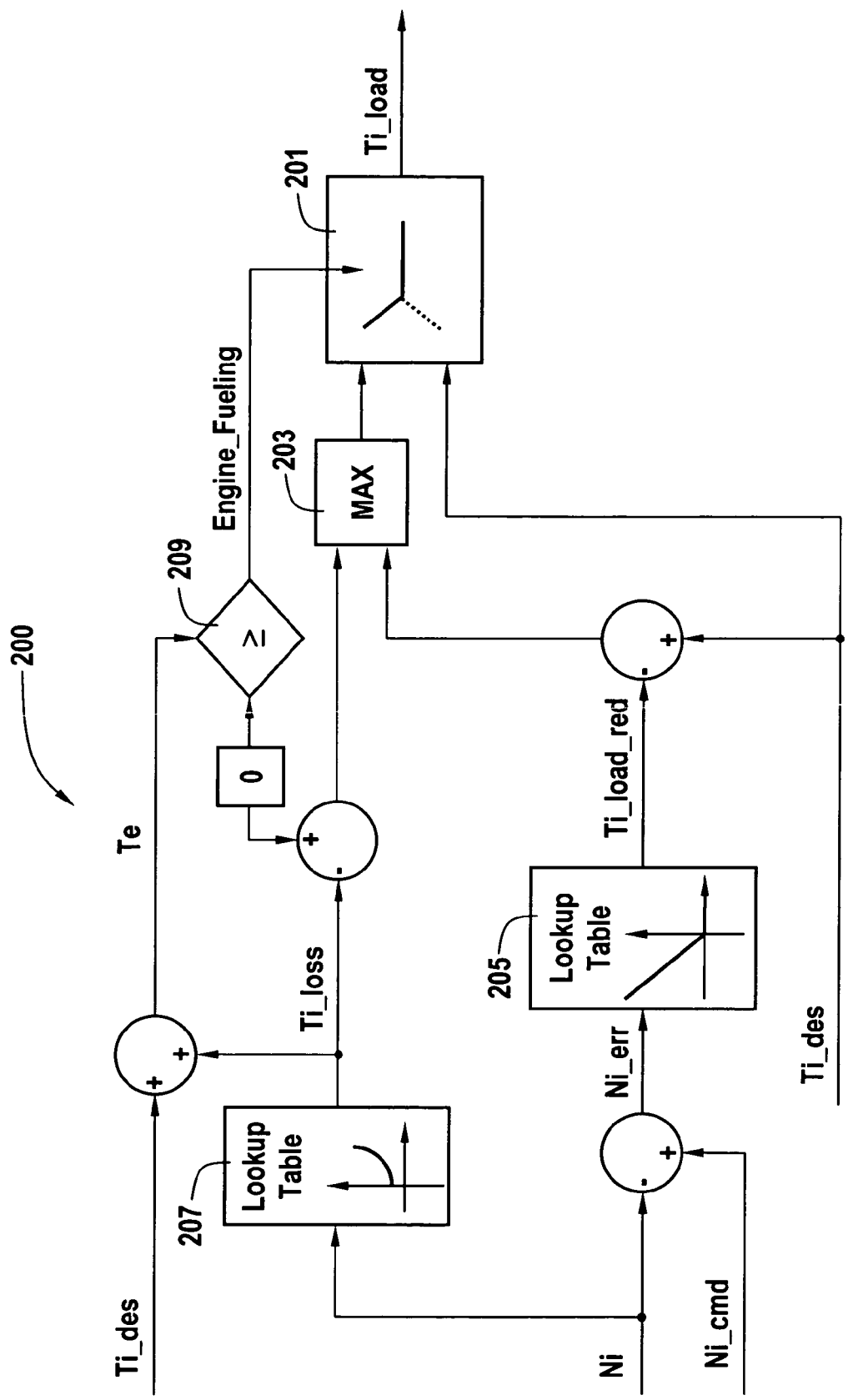
FIG. 4 is a schematic input load adjustment control diagram corresponding to the input load adjustment illustrated in FIG. 2 in accordance with the present invention.

Input load adjustments may be applied to the desired input load torque as further described herein below in conjunction with FIG. 4 to effectively improve the speed convergence of the engine to the desired speed and to avoid dragging the engine speed down by overly aggressive input load torque development by the motors due to the substantially instantaneous torque response of the motors as compared to torque response of the engine. Inputs into the input load regulation block 200 include EVT input speed which is calculated from motor speeds Na and Nb and known speed relationships with the transmission input, desired input load torque, Ti_des, and desired input speed command, Ni_cmd. Motor speeds are sensed by the motor controller portion of the ESS controller and provided to the system controller 43 which calculates the input speed, Ni, therefrom for use in system controls. Alternative manners of input speed determination include provision by the engine controller in accordance with conventional engine speed processing or separate determination such as by a conventional speed sensor at the transmission input. Any adjustment to the desired input load torque, Ti_des, is only relevant during periods of engine operation wherein the engine is being fueled and providing a positive torque to the transmission input. No adjustment is relevant for period of engine operation during which the engine is being motored, e.g., during vehicle coastdown, regenerative and engine retard braking events, etc. Therefore, the input load torque, Ti_load, that is provided by block 200 is controllably selected at block 201 from a pair of possibilities in accordance with the switch input (Engine_Fueling), the determination of which is described further herein below. When Engine_Fueling is true, then the selection block chooses the output from MAX block 203 which passes the greater of two inputs thereto, the inputs being described further herein below. When Engine_Fueling is false, thus indicating no need for any torque adjustment, then the selection block chooses the desired input load torque (an unadjusted value) for the input load torque, Ti_load.

One input to the MAX block 203 comprises a one-sided adjustment to the provided desired input load torque, Ti_des. The desired input load torque, Ti_des, is provided to a summing node whereat an input load torque reduction (Ti_load_red) is subtracted therefrom. Ti_load_red is provided from a lookup table 205 which provides a set of reduction torques referenced by the input speed error (Ni_err) as determined by the difference between input speed, Ni, and desired input speed command, Ni_cmd. Input speed errors greater than zero, indicating engine speed in excess of the commanded speed, return a zero input load torque reduction, Ti_load_red. But input speed errors less than zero, indicating an engine speed deficit from the commanded speed, return a non-zero input load torque reduction, Ti_load_red. The input load torque reduction generally increases with increasing positive input speed errors. The lookup table is populated with data derived from empirical testing and calibration techniques.

Input speed, Ni, is also provided to reference lookup table 207 which provides an estimate of torque losses to the input member (Ti_loss). These losses represent parasitic reductions in torque produced by the engine due predominantly to friction and engine driven accessories. This lookup table is also populated with data derived from empirical testing and calibration techniques. Ti_loss is added to the desired input load torque, Ti_des, to establish a metric of the engine output torque (Te). Te is provided to comparison block 209 to determine, essentially, whether the engine is being fueled, i.e., presenting a positive drive torque to the transmission input. Therefore, where the engine output torque, Te, is not less than zero, the output Engine_Fueling from block 209 is true and the output from MAX block 203 is selected by block 201. The sign of Ti_loss is reversed by subtracting it from zero and provides the result to the MAX block 203 as the second input thereto. As previously indicated, MAX block 203 selects as its output the greater of the two inputs thereto. Its output is only relevant when positive engine torques are being produced and its output is selected by selection block 201 as the desired input load torque. MAX block 203 essentially provides a rationality check limit function upon the adjusted desired input load whereby negative values thereof in magnitudinal excess of the input member torque loss, Ti_loss, are not allowed to pass to the selection block 201. Rather, in those situations, Ti_loss would be provided as the output of MAX block 203, effectively limiting any negative input load torque, Ti_load.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for operating a vehicular powertrain including an electrically variable transmission having operatively coupled engine, driveline and motors comprising:
   operating the engine in a torque control mode and controlling engine speed by the operatively coupled motors during periods in which all motors are operating as expected; and
   operating the engine in a speed control mode and controlling the engine load torque by the operatively coupled motors during periods in which at least one motor is not operating as expected.

2. The method as claimed in claim 1 further comprising adjusting the engine load torque as a function of the difference between a desired engine speed and actual engine speed.

3. The method as claimed in claim 1 wherein engine load torque is constrained to load torques that are feasible in accordance with said at least one inoperative motor.

4. An article of manufacture having instructions therein for effecting control of a vehicular powertrain including an electrically variable transmission having operatively coupled engine, driveline and motors, comprising:
   code for commanding engine operation in a torque control mode during periods in which all motors are operating as expected;
   code for controlling engine speed by the operatively coupled motors during periods in which all motors are operating as expected;
   code for commanding engine operation in a speed control mode during periods in which at least one motor is not operating as expected; and
   code for controlling engine load torque by the operatively coupled motors during periods in which at least one motor is not operating as expected; and
   a computer readable medium that stores the code.

5. Method for operating a vehicular powertrain including an electrically variable transmission having operatively coupled engine, driveline and motors comprising:
   operating the engine in a torque control mode and controlling engine speed with the motors when all motors are operative; and
   operating the engine in a speed control mode and controlling engine load torque with operative ones of the motors when not all motors are operative.

6. Method for operating a vehicular powertrain including an electrically variable transmission having operatively coupled engine, driveline and motors comprising:
   operating the engine in a speed control mode and controlling engine load torque with operative ones of the motors when not all motors are operative; and
   adjusting the engine load torque as a function of the difference between a desired engine speed and actual engine speed.

7. The method for operating a vehicular powertrain as claimed in claim 6 further comprising:
   constraining engine load torque to load torques that are feasible in accordance with said operative ones of the motors.

8. Method for operating a vehicular powertrain including an electrically variable transmission having operatively coupled engine, driveline and motors comprising:
   operating the engine in a speed control mode and controlling engine load torque with operative ones of the motors when not all motors are operative; and
   constraining engine load torque to load torques that are feasible in accordance with said operative ones of the motors.

* * * * *